(12) United States Patent
Deppe

(10) Patent No.: US 7,373,841 B2
(45) Date of Patent: May 20, 2008

(54) CORIOLIS MASS FLOWMETER DETERMINING STATE OF WEAR OF THE PIPE

(75) Inventor: Lothar Deppe, Göttingen (DE)

(73) Assignee: ABB Patent GmbH, Ladenburg (DE)

( * ) Notice: Subject to any disclaimer, the term of this patent is extended or adjusted under 35 U.S.C. 154(b) by 55 days.

(21) Appl. No.: 10/581,632

(22) PCT Filed: Nov. 30, 2004

(86) PCT No.: PCT/EP2004/013559

§ 371 (c)(1),
(2), (4) Date: Jun. 2, 2006

(87) PCT Pub. No.: WO2005/054790

PCT Pub. Date: Jun. 16, 2005

(65) Prior Publication Data

US 2007/0062308 A1  Mar. 22, 2007

(30) Foreign Application Priority Data

Dec. 3, 2003 (DE) .................... 103 56 383

(51) Int. Cl.
*G01F 1/84* (2006.01)

(52) U.S. Cl. ................................. 73/861.355

(58) Field of Classification Search ..........................
73/861.355–861.357, 86, 592
See application file for complete search history.

(56) References Cited

U.S. PATENT DOCUMENTS

| | | | |
|---|---|---|---|
| 5,454,267 A * | 10/1995 | Moreau et al. | 73/623 |
| 5,926,096 A * | 7/1999 | Mattar et al. | 340/606 |
| 6,601,005 B1 * | 7/2003 | Eryurek et al. | 702/104 |
| 2005/0011278 A1 * | 1/2005 | Brown et al. | 73/861.18 |
| 2007/0017274 A1 * | 1/2007 | Wheeler et al. | 73/1.16 |

* cited by examiner

*Primary Examiner*—Harshad Patel
(74) *Attorney, Agent, or Firm*—Paul R. Katterle; Michael M. Rickin

(57) ABSTRACT

The invention concerns a Coriolis mass flowmeter comprising at least one conduit (9) traversed by the mass, which produces mechanical vibrations under the effect of an excitation unit (8) and acts as an oscillating element, whereof the oscillating behaviour which varies based on the mass flow rate is sensed by at least one sensor (15, 16) to determine the mass flow. The invention aims at determining the degree of wear of the conduit (9). Therefor, the excitation unit (8) applies a single excitation pulse to the conduit (9), whereof the oscillatory response is sensed by the sensor (15; 16). The invention is characterized in that an evaluating unit (10) arranged downstream calculates the initial dampening constant recorded when the conduit (9) was new.

9 Claims, 2 Drawing Sheets

CORIOLIS MASS FLOWMETER DETERMINING STATE OF WEAR OF THE PIPE

CLAIM OF PRIORITY

This application is the national phase filing of International Application No. PCT/EP2004/013559 filed on Nov. 30, 2004 published as WO2005/054790 which designated at least one country other than the United States of America ("the PCT Application") and the PCT Application claims the priority of German Application No. 103 56 383.0 filed on Dec. 3, 2003 ("the German Application") and the contents of the PCT Application and the German Application are relied upon and incorporated herein by reference in their entirety, and the benefit of priority under 35 U.S.C. 119 is hereby claimed.

The invention relates to a Coriolis mass flowmeter which has at least one pipe through which the mass flows, which pipe can be made by an excitation unit to undergo mechanical vibration as an oscillating element, the oscillating behavior of which, changing in dependence on the mass flow, can be sensed by means of at least one sensor for determining the mass flow. In addition, the invention also relates to a method for operating such a Coriolis mass flowmeter.

A Coriolis mass flowmeter serves for measuring the flow of fluid masses on the basis of fluid mechanics and is used in installations in which the precision of the mass flow is relevant, such as in refineries for example.

Such a Coriolis mass flowmeter is already known from DE 300 7361 C3, which is of the same generic type. The Coriolis mass flowmeter, which in this case has a symmetrical construction, substantially comprises an inflow flange and outflow flange, which establish the connection between inflow and outflow pipe legs and external inflow and outflow pipes. A measuring pipe connects the inflow and outflow pipe legs in such a way that a shape similar to the Greek letter Ω is obtained for the Coriolis mass flowmeter.

Configurations with double, parallel pipe runs are also known. At the connecting points there are in each case an inflow recording point and outflow recording point. Each Coriolis mass flowmeter of the type of interest here is based on the following physical principle:

An excitation unit makes the measuring pipe vibrate. The oscillations sensed at the inflow and outflow recording points are of the same phase. When the fluid mass flows through the Coriolis mass flowmeter, it undergoes accelerated oscillatory deflections, which produce a Coriolis force. The originally sinusoidal, uniform oscillation of the pipe then undergoes influences of the Coriolis force distributed along the measuring pipe, which causes a phase shift for the inflow and outflow recording points. The oscillation phases and oscillation amplitudes are recorded at the inflow and outflow recording points by means of inflow and outflow sensors and fed to an evaluation unit. The magnitude of the phase shift is a measure of the mass flow.

How the phase shift relates to the mass flow is determined for each Coriolis mass flowmeter by a calibration. The magnitude of the phase shift is dependent on the resilience and mass of the pipe run. The resilience is in turn dependent on the pipe geometry and the material rigidity. The pipe geometry describes for example the nominal diameter and the wall thickness of the pipe.

As long as the material data and the pipe geometry remain unchanged, the calibration carried out retains its validity. If, however, the geometry of the pipe—for example the wall thickness—changes, the calibration once carried out is no longer valid.

A disadvantage of the known Coriolis mass flowmeter is that an abrasive and/or corrosive flowing fluid mass can attack and erode the wall thickness of the pipe run here. Such wear changes both the nominal pipe diameter and the pipe wall thickness, and consequently the resilience of the pipe changes. Such a change of the pipe resilience causes a changed phase shift for the same mass flow and gives an erroneous measure of the mass flow.

A further disadvantage is the increase in material fatigue as a result of the reduction in the wall thickness of the pipe run and consequently, in an extreme case, component failure in the form of fatigue ruptures.

The object of the invention is therefore to provide a means of making it possible to predict the respective mechanical condition of the pipe run in order to prevent such component failure.

The object is achieved on the basis of a Coriolis mass flowmeter according to the preamble of claim 1 in conjunction with its characterizing features. The dependent claims reproduce advantageous developments of the invention.

The object is achieved according to the invention by providing that, to determine the current state of wear of the pipe, the excitation unit imparts a single oscillatory pulse to the pipe, the oscillatory response of which is sensed by means of the at least one sensor and used by a downstream evaluation unit as a basis for calculating the current damping constant of the pipe and comparing this with a stored, original damping constant of the pipe when it was new.

This solution has the advantage that the individual, characteristic curve of the Coriolis mass flowmeter, and consequently the decay constant, of the pipe run are sensed and can be used as a measure of the operating reliability of the component. This means can be used both as a detector for the respective operating state of the eroded and/or corroded Coriolis mass flowmeter concerned and as verification for the abrasion or corrosion resistance of the Coriolis mass flowmeter concerned. This means takes on special significance in particular with regard to manufacturer liability and risk analysis, required in guidelines for pressure instruments, and avoidance of risks.

It is best if a mass flow is not taking place when the single oscillatory pulse is imparted to the pipe by the excitation unit, in order that the measurement of the state of wear is not influenced by disturbances. The damping behavior of the Coriolis mass flowmeter may, however, also being recorded under simultaneous mass flow. The disturbing mass flow can subsequently be eliminated by a computational program, which makes allowance for the fluid data such as the viscosity, the density, the oscillating conditions of the measuring pipe and the operating temperature. The advantage of this way of sensing the damping behavior of the Coriolis mass flowmeter is that operation in a continuously operating installation does not have to be interrupted.

Instead of the electromagnetically excitable steel measuring pipe that is usually used, an electromagnetically neutral measuring pipe with at least one excitation aid may also be used. The advantage of the alternative material for the measuring pipe is that, depending on the fluid mass and its corrosive or abrasive property, an appropriate material can be used.

Ceramic materials may be used for the measuring pipe. The advantage of ceramic materials for the measuring pipe is the resistance of these materials to abrasion. Plastics may also be used for the measuring pipe. The advantage of plastics for the measuring pipe is the resistance of these materials to corrosion.

Further means that improve the invention are provided by the subclaims or are described in more detail below together with the description of a preferred exemplary embodiment of the invention on the basis of the figures, in which:

Figure 1:
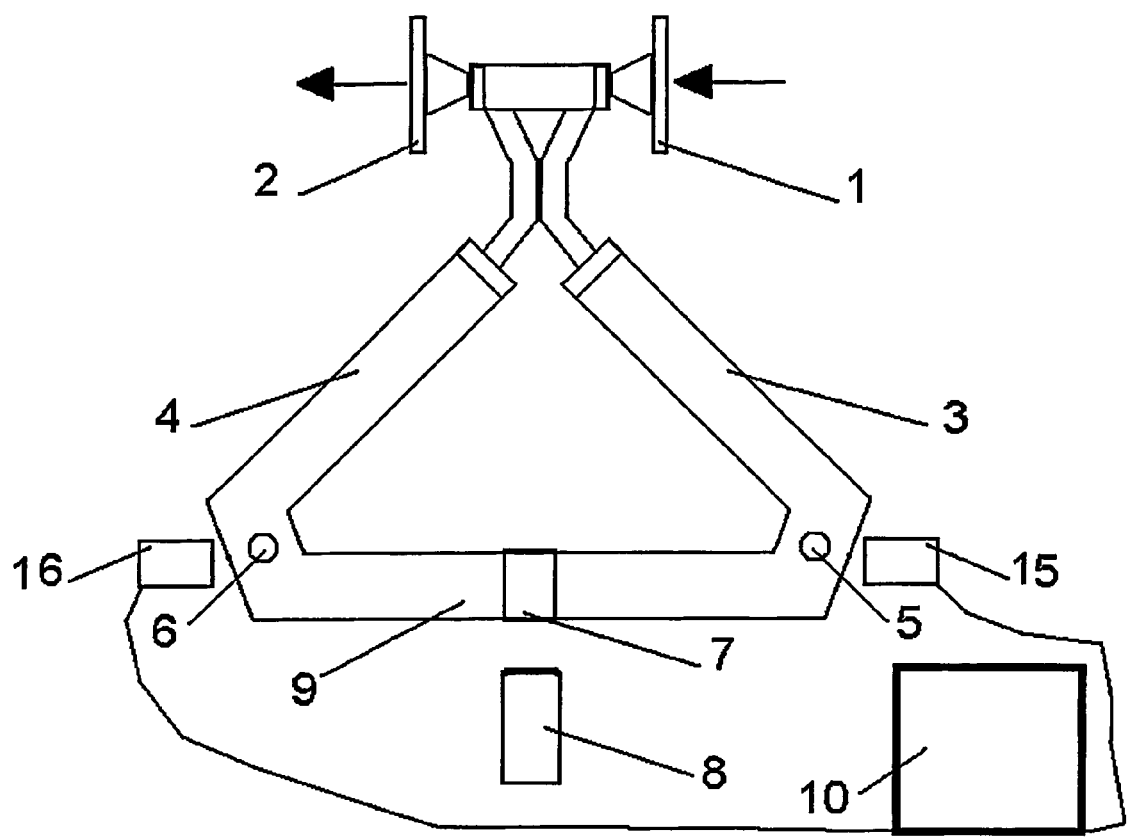
FIG. 1 shows a schematic side view of a Coriolis mass flowmeter.

According to FIG. 1, a Coriolis mass flowmeter includes, inter alia, an inflow flange 1, which together with an inflow pipe leg 3, a measuring pipe 9, an outflow pipe leg 4 and an outflow flange 2, forms a pipe arrangement which has a shape similar to the Greek letter Ω and through which the fluid mass to be measured flows. The inflow flange 1 connects an external supply flow pipe to the inflow pipe leg 3. The outflow flange 2 connects an external outflow pipe to the outflow pipe leg 4.

The inflow flange 1 and the outflow flange 2 serve as a holder for the Coriolis mass flowmeter. An excitation unit 8 makes the Coriolis mass flowmeter vibrate by a single excitation. The damped oscillating behavior of the Coriolis mass flowmeter is recorded in the presence of a mass flow as a characteristic curve at a recording point 5 by means of a sensor 15, which is connected to an electronic evaluation unit 10. The evaluation unit 10 determines the characteristic curve of the Coriolis mass flowmeter from the data for the current state.

Figure 2:
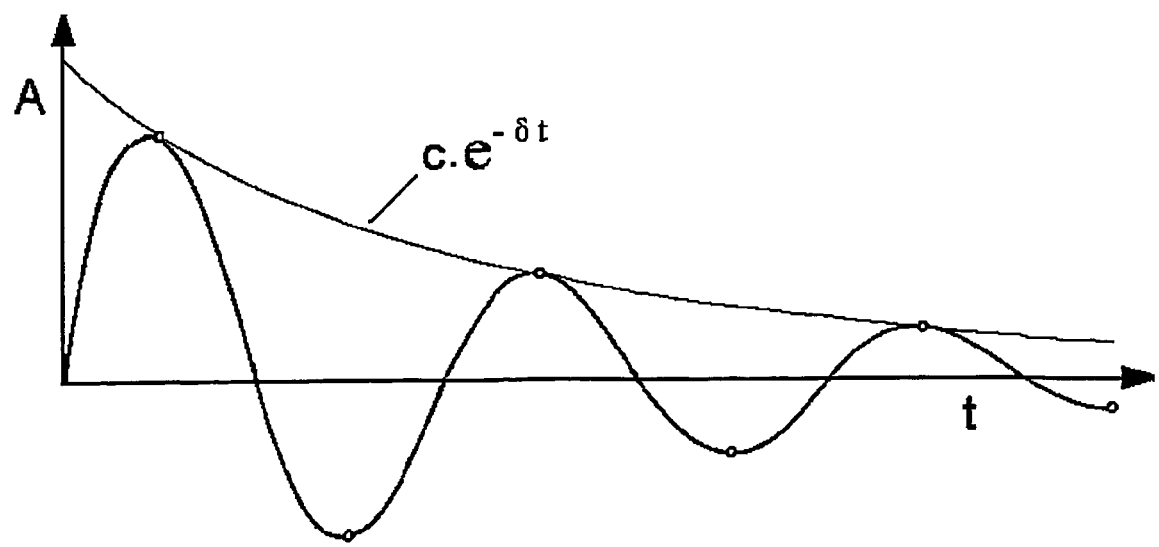
FIG. 2 shows a decay curve of a damped oscillating system.

The diagram represented in FIG. 2 shows a typical characteristic curve which was recorded in the description of FIG. 1 at the recording point 5.

The x axis t shows the time and the y axis A the amplitude.

For the envelope which forms a tangent to the vertices of the oscillation:

$$A = c \cdot e^{-\delta t}$$

where c=constant and

σ=decay constant.

These two constants are characteristic and act as a kind of fingerprint of the respective operating state of the Coriolis mass flowmeter concerned. This makes it possible to document the progression of the changes of the constants and draw a conclusion as to the abrasion or corrosion behavior. This means can be used to verify the abrasion or corrosion resistance of a Coriolis mass flowmeter.

The invention claimed is:

1. A Coriolis mass flowmeter comprising:
   an evaluation unit,
   at least one pipe (9) through which a mass flows,
   an excitation unit (8) to make the at least one pipe undergo mechanical vibration as an oscillating element, the oscillating behavior of which, changing in dependence on the mass flow,
   at least one sensor (15, 16) for sensing the oscillating behavior of the at least one pipe to determine the mass flow, wherein to determine the current state of wear of the pipe (9), the excitation unit (8) imparts a single oscillatory pulse to the pipe (9), the oscillatory response of which is sensed by the at least one sensor (15; 16) and is used by the evaluation unit (10) as a basis for calculating the current damping constant of the pipe (9) and comparing this with a stored, original damping constant of the pipe (9) when it was new.

2. The Coriolis mass flowmeter as claimed in claim 1, wherein there is a mass flow when the single oscillatory pulse is imparted to the pipe (9) by the excitation unit (8), the effect of this mass flow being computationally eliminated by the evaluation unit (10) to determine the individual damping constant of the pipe (9).

3. The Coriolis mass flowmeter as claimed in claim 1, wherein a mass flow is not taking place when the single oscillatory pulse is imparted to the pipe (9) by the excitation unit (B).

4. The Coriolis mass flowmeter as claimed in claim 1, wherein the at least one pipe (9) comprises a magnetically neutral pipe with at least one excitation aid (7) attached thereto, the excitation aid (7) comprising a ferromagnetic body used by the excitation unit (8) for making the pipe (9) vibrate.

5. The Coriolis mass flowmeter as claimed in claim 4, wherein the magnetically neutral pipe (9) consists of a ceramic material.

6. The Coriolis mass flowmeter as claimed in claim 4, wherein the magnetically neutral pipe (9) consists of a plastic.

7. A method for operating a Coriolis mass flowmeter as to determine the current state of wear of a pipe (9), of the Coriolis mass flowmeter the method comprising:
   applying a single oscillatory pulse to the pipe,
   sensing an oscillatory response to the pulse
   calcutating a current damping constant of the pipe (9) from the response, and
   comparing the current damping constant with a stored, original damping constant of the pipe (9) when the pipe was new.

8. The method as claimed in claim 7, wherein a mass is flowing through the pipe when the single oscillatory pulse is imparted to the pipe (9) the effect of this mass flow being ccmputatbnally eliminated to determine the individual damping constant of the pipe (9).

9. The method as claimed in claim 7, wherein a mass flow is not taking place when the single oscillatory pulse is imparted to the pipe (9).

* * * * *